Patented July 30, 1946

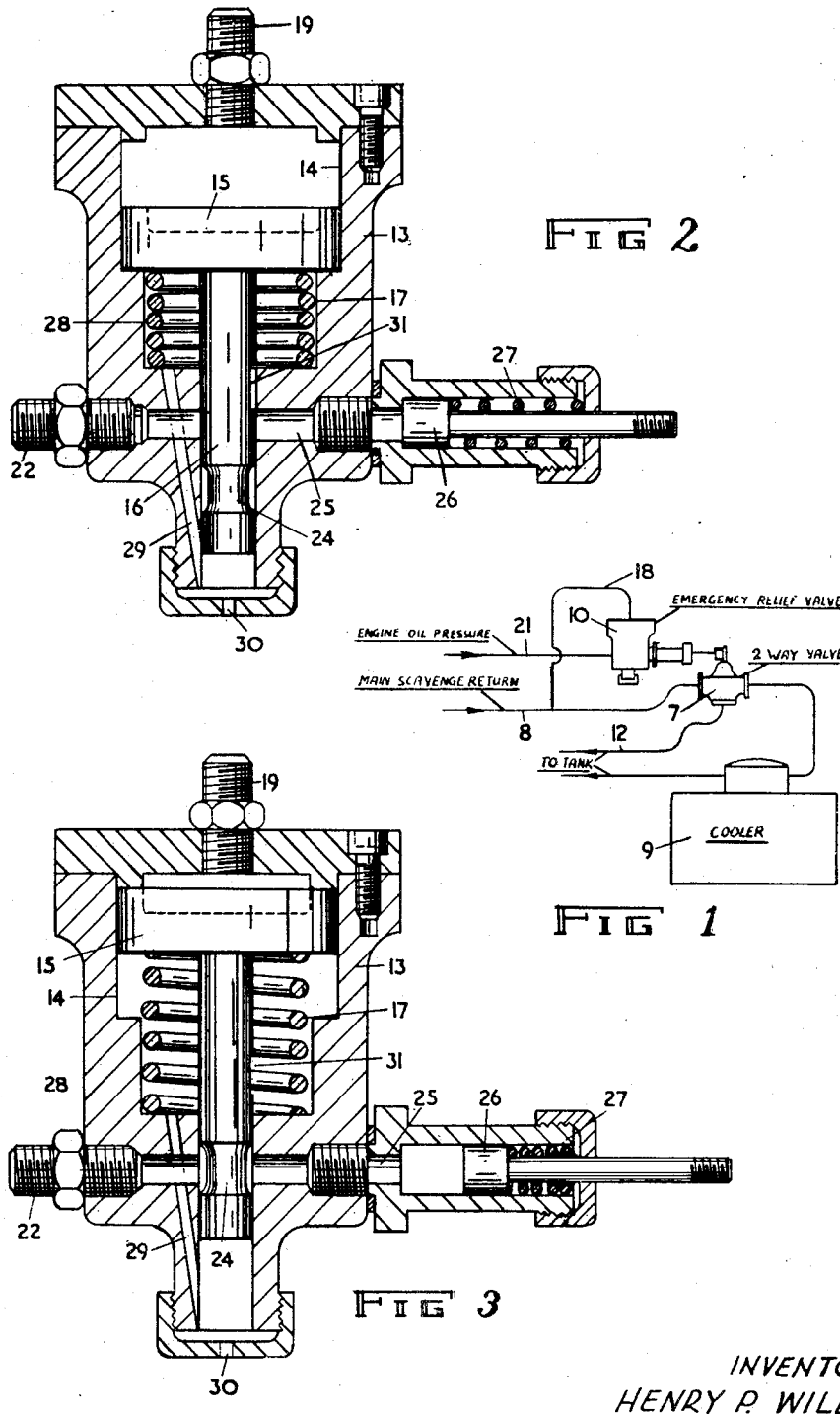

2,404,936

UNITED STATES PATENT OFFICE 2,404,936

EMERGENCY RELIEF VALVE FOR USE IN AUTOMATICALLY BY-PASSING A HYDRAULIC UNIT OR THE LIKE

Henry P. Wills, Ottawa, Ontario, Canada, assignor to Armstrong Siddeley Motors Limited, Coventry, England Application February 8, 1945, Serial No. 576,808
In Great Britain September 27, 1944

2 Claims. (Cl. 137—153)

The main object of the present invention is to provide a simple and satisfactory form of emergency relief valve for use in automatically by-passing a hydraulic unit or pipe line in the event of damage or leakage thereof causing a predetermined drop in the hydraulic pressure.

For example, most aero engines carry an oil cooler, in the return oil pipe leading to the oil reservoir, which is in a rather vulnerable position, especially in the case of a single-engined combat type of aircraft, when it is usually below the main engine cowling. Not only is it liable to become damaged in combat, but it is not easily possible for the pilot or crew to become aware of its being damaged, with the result that the oil of the system may rapidly flow away, resulting in engine seizure. But by-passing the oil cooler automatically, if such damage should occur, the engine is able to carry on even if it tends to overheat, the bulk of the oil being retained.

The emergency relief valve of the invention has a main plunger to one face of which the hydraulic pressure is applied, the plunger being biassed against the hydraulic pressure by a weaker spring, and a main valve controlled by the plunger is automatically operated when the plunger operates, i. e., when the hydraulic pressure falls below the spring pressure, and on operation controls the supply of a fluid pressure (for example, that from the main pressure pump, in the case of an aero or other engine having a main pressure pump and a scavenge pump) to a spring-pressed auxiliary plunger connected to a by-passing valve so as to actuate the latter on the operation of the main valve. Conveniently, the latter is provided by a valve stem slidable with the main plunger and adapted in the operated position to interconnect ports leading, respectively, to the said supply of fluid pressure and the appropriate face of the auxiliary plunger. The chamber at the appropriate side of the main plunger should drain to atmosphere. Preferably the chamber at the appropriate side of the auxiliary plunger can drain to atmosphere through a portion of the valve stem when the main valve is in the inoperative (closed) position.

In the accompanying drawing:

Figure 1 is a diagram showing an arrangement of parts, incorporating an emergency relief valve according to the invention, for automatically by-passing an oil cooler of an aero engine fitted with a main oil pump for drawing oil from the reservoir or tank and supplying it to the main and other bearings, and with a scavenge pump for returning oil from the engine sump to the tank; and Figures 2 and 3 are cross-sections, taken through the emergency relief valve, showing, respectively, the latter when all is in order (Figure 2) and when a sufficient leakage has occurred in the oil cooler or associated pipeline to cause the emergency relief valve to operate (Figure 3).

It is believed that Figure 1 will be self-explanatory. In ordinary conditions the two-way valve 7 is set so that the main scavenge return passes along the pipe 8 to the oil cooler 9 (which may incorporate an oil cleaner and/or filter) on its way to the tank (not shown). In the event of the failure of the oil cooler or of the associated passages the two-way valve 7 throws over to its other position, under the control of the emergency relief valve 10, and the cooler is then by-passed, the return from the scavenge pump then passing to the tank along the pipeline 12.

Referring now to Figures 2 and 3, in these the emergency relief valve 10 is shown as having a body 13 providing a cylindrical bore 14 in which operates a main plunger 15 fast with a valve stem 16. A main spring 17 biasses the plunger upwardly and it will be observed, from Figure 1, that the delivery from the scavenge pump along the line 8 is applied along the line 18 to the nipple 19 (Figures 2 and 3), i. e., to the space adjacent the upper face of the main plunger 15. If, for example, the normal pressure in the pipe 8 is, say, 8 lbs. at normal R. P. M., the spring 17 will have a strength of, say, 6 lbs., so that in these conditions it will be fully compressed, as shown by Figure 2. The delivery of the main pump along the pipeline 21 (which may, for example, be connected with the ordinary oil gauge) is led to the nipple 22.

In the event of a failure in the oil cooler, causing a pressure drop in the main scavenge return above 2 lbs., the main plunger 15 will rise under the applied pressure difference to bring the waisted portion 24 of the valve stem 16 into alignment with the passage leading to the nipple 22 and with a passage 25 leading to the adjacent end of a cylindrical chamber in which works a plunger 26 spring-pressed to the position shown in Figure 2; and the resultant pressure difference upon the plunger 26 will operate it to the position shown in Figure 3, in which the two-way valve 7 of Figure 1 is moved to the by-passing position.

At all times the chamber 28 beneath the main plunger 15 can drain along the passage 29 to the lower end of the casing and then exhaust to atmosphere through the opening 30; and when the valve 16 is in its inoperative or closed position of Figure 2 the cut-away portion 31 thereof interconnects the passage 25 leading to the adjacent face of the plunger 26 and the interior of the chamber 28, so that on re-setting or starting (when the oil cooler will be brought into circuit by the two-way valve 7) the plunger 26 can drive back any oil against its face, which will then in due course drain away.

Thus, by means of the invention one can ensure that, in the event of a fracture, the oil cooler will be automatically by-passed very quickly, before the leakage has been sufficient to cause serious loss of engine oil, and the engine can therefore continue with the remaining oil. Naturally, this will tend to become overheated, but that is much less objectionable than that the whole of the oil should be lost.

What I claim as my invention and desire to secure by Letters Patent of the United States is:

1. For use in automatically by-passing a hydraulic unit or pipeline in the event of damage or leakage thereto causing a predetermined drop in the hydraulic pressure, an emergency relief valve having a main plunger, means for applying the hydraulic pressure to one face thereof, the plunger being biassed against the hydraulic pressure by a weaker spring, a main valve, controlled by the plunger, which is operated when the hydraulic pressure falls below the spring pressure and the plunger moves accordingly, a spring-biassed auxiliary plunger the supply of a fluid pressure to which is controlled by the operation of said main valve, and a by-passing valve connected to said auxiliary plunger so as to be actuated on the operation of said main valve.

2. An emergency relief valve, according to claim 1, in which the main valve is normally closed and comprises a valve stem slidable with the main plunger and adapted, in the said operated position, to interconnect ports leading, respectively, to the said supply of fluid pressure and the appropriate face of the auxiliary plunger.

HENRY P. WILLS.